(12) United States Patent
Sunada et al.

(10) Patent No.: US 7,073,201 B2
(45) Date of Patent: Jul. 11, 2006

(54) AQUEOUS ADHESIVE

(75) Inventors: Kiyoshi Sunada, Niigata (JP); Kunio Kaneda, Niigata (JP); Mikio Yamaguchi, Niigata (JP)

(73) Assignee: Denki Kagaku Kogyo Kabushiki Kaisha, Tokyo (JP)

( * ) Notice: Subject to any disclaimer, the term of this patent is extended or adjusted under 35 U.S.C. 154(b) by 378 days.

(21) Appl. No.: 10/108,434

(22) Filed: Mar. 29, 2002

(65) Prior Publication Data

US 2003/0182704 A1  Oct. 2, 2003

(51) Int. Cl.
*B63C 11/04* (2006.01)
*C09J 115/02* (2006.01)

(52) U.S. Cl. .................. 2/2.15; 156/304.1; 156/333; 428/317.7; 524/835; 524/839

(58) Field of Classification Search ........... 524/552, 524/764, 834, 835, 839; 156/331.4, 333
See application file for complete search history.

(56) References Cited

U.S. PATENT DOCUMENTS 3,294,617 A * 12/1966 Way ................. 428/61
5,527,846 A    6/1996 Christell et al.
6,525,132 B1 * 2/2003 Oba et al. .............. 524/764

FOREIGN PATENT DOCUMENTS

| JP | 10-183091 A | * | 7/1998 |
| JP | 2000-104028 | | 4/2000 |
| JP | 2001-64616 A | * | 3/2001 |
| JP | 2001-89727 | | 4/2001 |
| JP | 2001-270003 | | 10/2001 |
| JP | 2001-288448 | | 10/2001 |
| JP | 2001-303002 | | 10/2001 |

OTHER PUBLICATIONS

W.K. Witsiepe, "Polychloroprene" article in Kirk-Othmer Encyclopedia of Chemical Technology, Ch. 8 entitled "Polychloroprene Latexes," 1993.*

* cited by examiner

*Primary Examiner*—Geoffrey L. Knable
(74) *Attorney, Agent, or Firm*—Oblon, Spivak, McClelland, Maier & Neustadt, P.C.

(57) ABSTRACT

A two part aqueous adhesive comprising a main agent containing a polychloroprene latex as a main component and a curing agent, the main agent and the curing agent being separated during storing or transporting.

9 Claims, 1 Drawing Sheet

AQUEOUS ADHESIVE

BACKGROUND OF THE INVENTION

1. Technical Field of the Invention

The present invention relates to a method for bonding a cloth and a foamed rubber material such as foamed polychloroprene or foamed polyurethane, and a bonded structure. More particularly, the present invention relates to a method for bonding a cloth and a foamed rubber material for constituting a marine diving suit such as a wet suit or a dry suit, and a bonded structure.

2. Discussion of Prior Art

Heretofore, a wet suit was prepared by coating a polychloroprene (hereinafter referred to as "CR") solvent type adhesive on a foamed rubber material such as foamed polychloroprene, foamed polyurethane or the like, laminating a cloth thereon to prepare a spongy base laminate, patterning, shaping, seaming or cutting, the spongy base laminate, and coating a CR solvent type adhesive on the cut surface (or seam part) to bond the laminate.

However, since the CR solvent type adhesive employs an organic solvent such as toluene, ethyl acetate, methyl ethyl ketone or the like, the organic solvent is evaporated during coating operation of the adhesive and consequently gives a bad influence on safety, sanitation or environment conditions of workers. Thus, it has been demanded to reduce such an organic solvent.

The present invention has been made in view of the above-mentioned prior arts, and an object of the present invention is to provide a method for bonding a foamed rubber material and a cloth at the same level or more firmly as compared with the conventional CR solvent type adhesive without causing the above-mentioned safety, sanitation or environment problems, and also to provide a bonded structure.

In order to achieve the above object, the present inventors have intensively studied, and have discovered that the above-mentioned problems can be solved by providing a method for bonding a cloth 3 as illustrated in the attached FIG. 1(c) to a foamed rubber material 1 as illustrated in the attached FIG. 1(a) with a two part aqueous adhesive comprising a combination of a main agent mainly containing a polychloroprene latex and a curing agent, which comprises a step of coating the adhesive as illustrated in the attached FIG. 1(b) on the foamed rubber material 1 as illustrated in the attached FIG. 1(a) and a step of overlaying and bonding the cloth 3 as illustrated in the attached FIG. 1(c) on the adhesive 2 immediately after coating the adhesive and before drying the adhesive. The present invention has been accomplished on the basis of this discovery.

Further, it has been discovered that above-mentioned problems can be solved also by providing a method for bonding cut surfaces to each other of a spongy base material (as illustrated in the attached FIG. 1(c)) prepared by laminating a foamed rubber material and a cloth by coating the cut surface with the above-mentioned adhesive and bonding, and the present invention has been made on the basis of this discovery.

SUMMARY OF THE INVENTION

A first aspect of the invention is to provide a two part aqueous adhesive comprising a main agent containing a polychloroprene latex as a main component and a curing agent, the main agent and the curing agent being separated during storing or transporting.

A second aspect of the invention is to provide the aqueous adhesive according to said first aspect, wherein the main agent contains (i) a polychloroprene latex obtained by emulsion-polymerizing chloroprene and 2,3-dichloro-1,3-butadiene in the presence of an alkali metal rosinate as an emulsifier and (ii) a tackifier resin in a solid content mass ratio of (i) 100 mass parts to (ii) 20–100 mass parts, and the curing agent is a curing agent containing a water dispersion type isocyanate compound.

A third aspect of the invention is to provide the aqueous adhesive according to said first aspect, wherein the main agent contains (i) a polychloroprene latex obtained by copolymerizing a chloroprene monomer and a carboxyl group-containing vinyl monomer in the presence of polyvinyl alcohol in water as a medium and (ii) a tackifier resin in a solid content mass ratio of (i) 100 mass parts to (ii) 20–100 mass parts, and the curing agent is a water dispersion type isocyanate curing agent.

A fourth aspect of the invention is to provide a method for bonding a foamed rubber material and a cloth, which comprises a step of coating the two part aqueous adhesive as defined in said first aspect comprising a combination of a main agent containing a polychloroprene latex as a main component and a curing agent on the surface of the foamed rubber material and a step of immediately overlaying the cloth on the aqueous adhesive coated on the foamed rubber material and press-bonding.

A fifth aspect of the invention is to provide a method for bonding cut surfaces to each other of a spongy part of a laminate of a foamed rubber material and a cloth, which comprises a step of coating the two part aqueous adhesive as defined in said first aspect comprising a combination of a main agent containing a polychloroprene latex as a main component and a curing agent on the cut surface of the laminate and a step of immediately bonding the cut surfaces to each other.

DETAILED DESCRIPTION OF THE PREFERRED EMBODIMENTS

Figure 1A:
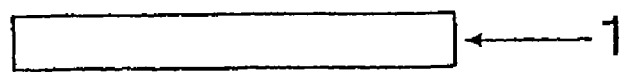
FIG. 1 illustrates a bonding method and a bonded structure, wherein 1 represents a foamed rubber material, 2 represents an adhesive and 3 represents a cloth.
Figure 1B:
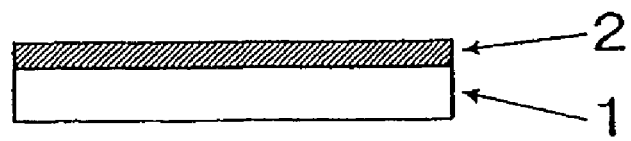
Figure 1C:
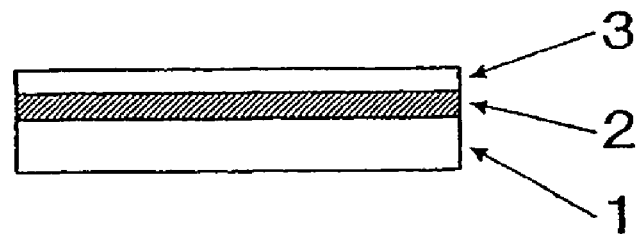

A polychloroprene latex used in the present invention may be any kind of polychloroprene latex, but preferable examples of the polychloroprene latex include a latex obtained by emulsion-copolymerizing 2-chloro-1,3-butadiene (hereinafter referred to as "chloroprene") and 2,3-dichloro-1,3-butadiene in the presence of an alkali metal rosinate or a latex mainly containing a copolymer obtained by copolymerizing a monomer mixture of 2-chloro-1,3-butadiene and at least one kind of carboxyl group-containing vinyl monomers as essential monomers in the presence of polyvinyl alcohol.

In case that the polychloroprene latex used in the present invention is a latex obtained by emulsion-copolymerizing 2-chloro-1,3-butadiene and 2,3-dichloro-1,3-butadiene in the presence of an alkali metal rosinate, it is preferable to carry out a method for bonding a foamed rubber material and a cloth, which comprises a step of coating the surface of the foamed rubber material with a two part aqueous adhesive mixture comprising a combination of a main agent containing the polychloroprene latex and a tackifier resin in a solid content ratio of 100 parts by weight to 20–100 parts by weight and a curing agent containing a water dispersion type isocyanate compound and a step of overlaying the cloth on the adhesive and press-bonding immediately after coating the adhesive. In such a case, it is further preferable that a toluene-insoluble content of the polychloroprene latex polymer contained in the main agent of the adhesive is from 50 to 99 wt %.

In case that the polychloroprene latex used in the present invention is a latex containing a copolymer as a main component, obtained by copolymerizing a monomer mixture of 2-chloro-1,3-butadiene and at least one kind of carboxyl group-containing vinyl monomers as essential monomers in the presence of polyvinyl alcohol, it is preferable to carry out a method for bonding a foamed rubber material and a cloth, which comprises a step of coating the surface of the foamed rubber material with a two part aqueous adhesive comprising a combination of a main agent containing the polychloroprene latex and a tackifier resin in a solid content ratio of 100 parts by mass to 20–100 parts by mass and a curing agent containing a water dispersion type isocyanate compound and a step of overlaying the cloth on the adhesive and press-bonding immediately after coating the adhesive. In such a case, it is further preferable that the polymer in the polychloroprene latex has a toluene-insoluble content of from 5 to 50 wt %.

Also, the present invention provides a bonded structure obtained by bonding a cloth on a surface of an adhesive layer coated on a foamed rubber material in accordance of the above-mentioned bonding method.

Hereinafter, the present invention is further illustrated in more details.

As a foamed rubber material used in the present invention, a natural or synthetic foamed rubber material can be satisfactorily used without any limitation, preferable examples of which include polychloroprene or chlorosulfonated polyethylene, which has closed cells and satisfactory contraction and expansion properties. Particularly when preparing a diving suit, it is preferable to use a foamed polychloroprene in view of fit feeling to a human body, contraction and expansion properties, light weight properties, heat-shielding properties and heat retaining properties.

Also, as proposed in JP-A-11-79078 (applicant: Inapoly Trading K.K.), a foamed rubber laminate having various different hardness or foaming magnification may be used.

Examples of the cloth used in the present invention include fabrics, knitted webs or non-woven fabrics, but fabrics or knitted webs having satisfactory contraction and expansion properties are preferable. Particularly, woven and knitted materials of two-way tricot (having stretching properties in both length and breadth directions) are more preferable. Concrete examples include nylon jersey or polyester jersey cloths. Particularly, in view of stretching properties and air permeability, a nylon jersey cloth is most preferable for a diving suit.

When the polychloroprene latex used in the present invention is a latex obtained by emulsion-copolymerizing 2-chloro-1,3-butadiene and 2,3-dichloro-1,3-butadiene in the presence of an alkali metal rosinate, the following polychloroprene latex is preferable.

A charging amount of 2,3-dichloro-1,3-butadiene is not specially limited, but it is preferable to use 2,3-dichloro-1,3-butadiene in an amount of from 2 to 30 parts by weight to 100 parts by weight of a total amount of monomers. By copolymerizing 2,3-dichloro-1,3-butadiene in an amount of at least 2 parts by weight, it is possible to lower a crystallinity of a polymer obtained and it is also possible to impart a flexibility to a diving suit which provides a comfortable feeling to wear. However, if the amount of 2,3-dichloro-1,3-butadiene exceeds 30 parts by weight, a crystallinity becomes too high, and an adhesive layer becomes hard, thereby losing a flexibility of a diving suit.

If necessary, it is possible to copolymerize a monomer copolymerizable with chloroprene other than 2,3-dichloro-1,3-butadiene. Examples of the monomer copolymerizable with chloroprene other than 2,3-dichloro-1,3-butadiene include 1-chloro-1,3-butadiene, butadiene, isoprene, styrene, acrylonitrile, acrylic acid, acrylic acid esters, methacrylic acid, methacrylic acid esters, and the like.

An emulsifier used for emulsion polymerization of the polychloroprene latex used in the present invention is an alkali metal rosinate, examples of which include sodium rosinate, potassium rosinate and the like. An amount of an alkali metal rosinate used for emulsion polymerization of the polychloroprene latex in the present invention is preferably from 0.1 to 10 parts by weight to 100 parts by weight of a monomer mixture comprising chloroprene and 2,3-dichloro-1,3-butadiene as essential monomers. If the amount of an alkali metal rosinate is less than 0.1 part by weight, its emulsifying effect is not satisfactory, and if this amount exceeds 10 parts by weight, a bonding strength of an adhesive obtained thereby is impaired.

A polymerization method of the copolymer of the present invention is not specially limited, and a solid content concentration, a molecular weight of a toluene-soluble part, a toluene-insoluble part (gel-containing amount) and the like can be adjusted by appropriately selecting a polymerization temperature, a polymerization catalyst, a chain transfer agent, a polymerization inhibitor, a final polymerization rate, a monomer removal rate, a concentration condition and the like.

A polymerization temperature of the copolymer employed in the present invention is not specially limited, but in order to satisfactorily carry out the polymerization reaction, the polymerization temperature employed is preferably from 10 to 50° C., more preferably from 30 to 50° C. A polymerization catalyst is not specially limited, examples of which include a persulfate such as potassium persulfate, an organic peroxide such as tertiary butyl hydroperoxide, and the like.

A chain transfer agent for the copolymer of the present invention is not specially limited, and a well known chain transfer agent usually used for emulsion polymerization of chloroprene can be used, examples of which include long chain alkyl mercaptans such as n-dodecyl mercaptan, tert-dodecyl mercaptan or the like, dialkyl xanthogen disulfides such as diisopropyl xanthogen disulfide, diethyl xanthogen disulfide or the like, iodoform, and the like.

A polymerization terminator (polymerization inhibitor) for the copolymer of the present invention is not specially limited, examples of which include 2,6-tertiary-butyl-4-methylphenol, phenothiazine, hydroxyl amine, and the like.

A final polymerization rate of the copolymer of the present invention is not specially limited, and can be optionally adjusted, and unreacted monomers can be removed by a monomer-removing operation, but a method for removing unreacted monomers is not specialty limited.

A solid content concentration of the polychloroprene latex of the present invention can be suitably adjusted by concentration or by dilution with water. A method for concentration is not specially limited, examples of which include concentration under reduced pressure. In view of a drying speed of an adhesive and a storage stability of a main agent of the adhesive, a solid content concentration of the polychloroprene latex is preferably from 50 to 70 wt %.

The polychloroprene latex of the present invention provides an adhesive excellent in balance of an initial bonding strength and a normal state bonding strength when the copolymer has a toluene-insoluble content (gel content) of from 50 to 99 wt %. If the toluene-insoluble content is lower than 50 wt %, a normal state bonding strength of the adhesive is unsatisfactory, and it is industrially impossible to obtain a polymer having a toluene-insoluble content of more than 99 wt %.

A tackifier resin used in the present invention is not specially limited, examples of which include rosin resin, polymerized rosin resin, α-pinene resin, β-pinene resin, terpenephenol resin, C5 fraction system petroleum resin, C9 fraction system petroleum resin, C5/C9 fraction system petroleum resin, DCPD system petroleum resin, alkylphenol resin, xylene resin, coumarone resin, coumarone indene resin, and the like. A practical bonding step for preparing a diving suit sometimes includes a step of heating at a temperature of at least 100° C., and in such a case, it is preferable that a resin selected has a softening point of from 80 to 160° C.

A method for adding a tackifier resin is not specially limited, but is preferable to add as an aqueous emulsion for uniformly dispersing the resin in the adhesive. Examples of a method for preparing an aqueous emulsion of a tackifier resin include a method comprising dissolving a tackifier resin in an organic solvent such as toluene, subjecting the solution to emulsification/dispersion by using an emulsifier and then removing the organic solvent by heating while reducing a pressure, and a method comprising pulverizing a tackifier resin into fine particles and subjecting the fine particles to emulsification/dispersion, but the former method is more preferable since an emulsion of finer particle can be obtained.

An amount of the tackifier resin added (as a solid content) is preferably from 20 to 100 mass parts to 100 mass parts of a solid content of polychloroprene latex. If the amount of the tackifier resin is less than 20 mass parts, a bonding strength of the adhesive to a surface of a foamed rubber material becomes poor, and if this amount exceeds 100 mass parts, an adhesive layer becomes brittle and easily causes unsatisfactory bonding.

When the polychloroprene latex used in the present invention is a copolymer obtained by copolymerizing a monomer mixture of 2-chloro-1,3-butadiene and at least one kind of carboxyl group-containing vinyl monomers as essential monomers, it is preferable to use the following polychloroprene latex.

Examples of a carboxyl group-containing vinyl monomer include methacrylic acid, acrylic acid, crotonic acid, fumaric acid, maleic acid, citraconic acid, glutaconic acid and the like, and if necessary, at least two kinds of carboxyl group-containing vinyl monomers may be used. Among them, methacrylic acid (which may be called as "2-methylpropenic acid" or "α-methylacrylic acid") is most preferable. In case of a copolymer of chloroprene and methacrylic acid, it is easy to control a viscosity at the time of polymerization and it is possible to impart a high water-resistant bonding strength to an adhesive.

If necessary, it is possible to copolymerize a monomer copolymerizable with chloroprene, in addition to a carboxyl group-containing vinyl monomer. Examples of the monomer copolymerizable with chloroprene, in addition to a carboxyl group-containing vinyl monomer, include 2,3-dichloro-1,3-butadiene, 1-chloro-1,3-butadiene, butadiene, isoprene, styrene, acrylonitrile, acrylic acid esters, methacrylic acid esters, and the like.

A charging amount of a carboxyl group-containing vinyl monomer is not specially limited, but it is preferable to charge a carboxyl group-containing vinyl monomer in an amount of 0.01 to 10 mass parts to 100 mass parts of a total amount of monomers. By copolymerizing a carboxyl group-containing vinyl monomer in an amount of at least 0.01 mass part, it is possible to lower a crystallinity of a copolymer obtained, and consequently it is possible to provide a flexibility and a satisfactory comfortable wearing feeling to a diving suit including a wet suit and a dry suit. However, if the amount of a carboxyl group-containing vinyl monomer exceeds 10 mass parts, a pot life becomes short after adding a curing agent and a water resistance is sometimes lowered, such being unpreferable. Further, if the amount is less than 0.01 mass part, a crosslinking effect with an isocyanate compound in a curing agent is hardly obtainable.

In the present invention, a saponification degree and a polymerization degree of polyvinyl alcohol are not specially limited, but the saponification degree is preferably from 60 to 95 mol % and the polymerization degree is from 200 to 700. Also, a modified type (such as an acetoacetyl-modified type or a type having a polyethylene unit (usually called as "RS type")) may be used.

An amount of polyvinyl alcohol used in the polymerization of polychloroprene latex in the present invention is preferably from 0.5 to 10 mass parts to 100 mass parts of a monomer mixture comprising chloroprene and a carboxyl group-containing vinyl monomer as essential monomers. If the amount of polyvinyl alcohol is less than 0.5 mass part, emulsification or dispersion is unsatisfactory, and if the amount of polyvinyl alcohol exceeds 10 mass parts, a viscosity is increased during polymerization reaction, and it becomes difficult to satisfactorily stir and a stable polymerization is hardly carried out.

A polymerization method of a copolymer in the present invention is not specially limited, and it is possible to adjust a solid content concentration, a molecular weight of toluene-soluble part, a toluene-insoluble content (gel content) and the like by appropriately selecting and controlling a polymerization temperature, a polymerization catalyst, a chain transfer agent, a polymerization inhibitor, a final polymerization rate, removal of a monomer, concentration conditions and the like.

A polymerization temperature of a copolymer in the present invention is not specially limited, but in order to satisfactorily carry out the polymerization reaction, it is preferable to employ a polymerization temperature of from 10 to 50° C., more preferably from 30 to 50° C.

Examples of a polymerization catalyst include a persulfate such as potassium persulfate or the like and an organic peroxide such as tertiary butyl hydroperoxide, or the like, but the polymerization catalyst is not specially limited.

A chain transfer agent and a polymerization terminator (polymerization inhibitor) for the copolymer of the present invention may be the same as illustrated above.

A final polymerization rate of the copolymer of the present invention is not specially limited, and is optionally adjusted. An unreacted monomer is removed by a monomer-removing operation, but its method is not specially limited.

A solid content concentration of the polychloroprene latex of the present invention can be adjusted to an aimed concentration by concentration or dilution with water. Examples of a method for concentration include a concentration under vacuum, but it is not specially limited. In view of a drying speed of an adhesive and a storage stability of a main agent of an adhesive, it is preferable that the polychloroprene latex has a solid content concentration of from 40 to 65 mass %.

If the polychloroprene latex of the present invention contains a copolymer having a toluene-insoluble content (gel content) of from 5 to 50 mass %, an excellent adhesive having well balanced initial bonding strength and normal state bonding strength can be provided. If the toluene-insoluble content is lower than 5 mass %, normal state bonding strength becomes poor, and if the toluene-insoluble content exceeds 50 mass %, an initial bonding strength becomes poor.

An amount of a tackifier resin (on the basis of solid content) added to the polychloroprene latex is preferably from 20 to 100 mass parts to 100 mass parts of the solid content of the polychloroprene latex. If the amount is less than 20 mass parts, an initial bonding strength becomes poor, and if the amount exceeds 100 mass parts, an adhesive film is not satisfactorily formed and bonding is liable to be unsatisfactory.

A main agent of the two part aqueous adhesive of the present invention can contain a tackifier resin in addition to a polychloroprene latex, and depending on properties required, it is possible to optionally add a metal oxide, a thickner, a filler, a UV ray absorber, an antioxidant, a film-forming agent, a plasticizer, a vulcanizer, a vulcanization-accelerator, a defoaming agent or the like.

In order to prolong a storage stability of the main agent, a metal oxide such as zinc oxide, magnesium oxide or the like may be added. The metal oxide can prevent pH from lowering by dehydrochlorination reaction of a polychloroprene polymer. These metal oxides are blended preferably in a state of aqueous dispersion, but they may be added in a state of powder.

Examples of an apparatus used for adding a metal oxide in a state of aqueous dispersion include a rotary type homogenizer, a media mill, a colloid mill, a high pressure type homogenizer, and the like, but are not specially limited. Typical examples of the rotary type homogenizer include a homomixer (manufactured by Tokushu Kika Kogyo K.K.), a Clea mix (manufactured by M•Technique Co., Ltd.) and the like, and typical examples of the media mill apparatus include a dynomill (manufactured by Shinmaru Enterprise K.K.) and the like. Typical examples of the colloid mill apparatus include a mass colloider (manufactured by Masuko Sangyo Co., Ltd.), and typical examples of the high pressure type homogenizer include a microfluidizer (manufactured by Microfluidics K.K.), a homogenizer (manufactured by␣APV GAULIN K.K.), ULTRAMIZER system (manufactured by Sugino Machine K.K.), DeBEE series (manufactured by Nihon BEE), and the like.

In order to adjust a viscosity of the main agent, a thickner may be added, and examples of the thickner include sodium polyacrylate, water-soluble polyurethane, association type polyurethane system emulsion, alkali-swelling type acryl system emulsion, carboxymethyl cellulose (CMC), methyl cellulose (MC), hydroxyethyl cellulose (HEC), hydroxypropyl cellulose (HPC), synthetic smectite, polyvinyl alcohol, and the like.

Examples of a film-forming agent include propylene glycol, n-butyl ether, dipropylene glycol, tripropylene glycol, 2,2,4-trimethyl-1,3-pentadiol monoisobutyrate, 2,2,4-trimethyl-1,3-pentadiol diisobutyrate, and the like.

It is effective to add a filler to the main agent in order to reduce a production cost, and examples of the filler include calcium carbonate, aluminum hydroxide, titanium oxide, barium sulfate, synthetic silica, and the like.

The curing agent used in the present invention may be various kinds of curing agents generally used for this purpose. Examples of the curing agent include a compound having a methylol group such as melamine resin, a compound having an epoxy group such as epoxy resin, a compound having an isocyanate group (isocyanate compound) such as a block isocyanate compound or a water dispersion type isocyanate compound, a compound having an oxazoline group, a compound having at least two hydroxyl groups in a molecule such as phenol resin or glycol resin, a compound having an imino group (imine compound), and the like. Among them, an isocyanate compound is preferable, and a water dispersion type isocyanate compound is particularly preferable.

A water dispersion type isocyanate compound which is a curing agent component in the present invention is a polyisocyanate polymer having a hydrophilic group introduced, which has a structure of biuret, isocyanurate, urethane, uretodione, allophanate or the like, obtained from aliphatic and/or cycloaliphatic diisocyanates. That is, this is a self-emulsifiable isocyanate compound which can be dispersed as fine particles in water when it is added and stirred in water.

Examples of the aliphatic and/or cycloaliphatic isocyanates include tetramethylene diisocyanate, pentamethylene diisocyanate, hexamethylene diisocyanate (HDI), trimethyl-hexamethylene diisocyanate, lysine diisocyanate (LDI), isophorone diisocyanate (IPDI), hydrogenated xylylene diisocyanate (hydrogenated XDI), tolylene diisocyanate (TDI), 4,4'-diphenylmethane diisocyanate (MDI), polymerized MDI, xylylene diisocyanate (XDI), naphthylene diisocyanate (NDI), paraphenylene diisocyanate (PPDI), tetramethyl xylylene diisocyanate (TMXDI), dicyclohexylmethane diisocyanate (HMDI), isopropylidene bis(4-cyclohexyl isocyanate) (IPC), cyclohexyl diisocyanate (CHDI), tolidine diisocyanate (TODI), and the like. Among them, HDI, MDI, IPDI and hydrogenated XDI are preferable since they are easily industrially available.

The effect achieved by a curing agent in the present invention depends further on an isocyanate group-containing ratio calculated in accordance with the method as defined in JIS K-7301 rather than a starting compound. In order to obtain a satisfactory bonding strength, an isocyanate group-containing ratio of an aqueous dispersion type isocyanate compound used is preferably from 17 to 25 wt %.

When using an aqueous dispersion type isocyanate compound as a curing agent for the two part aqueous adhesive of the present invention, in addition to this, it is possible to use water or an organic solvent which can dissolve the aqueous dispersion type isocyanate compound. However, since an isocyanate group reacts with water also, it is preferable to use the aqueous dispersion type isocyanate compound alone as a curing agent if it is not necessary to adjust a viscosity of the curing agent.

A main agent and a curing agent are mixed preferably in such a mixing ratio as to use from 0.5 to 15 mass parts of a solid content of an aqueous dispersion type isocyanate compound in the curing agent to 100 mass parts of a solid content of a polychloroprene latex in the main agent. If the solid content of the aqueous dispersion type isocyanate compound is less than 0.5 mass part, a bonding strength becomes poor, and if this amount exceeds 15 mass parts, a hardness of an adhesive layer becomes too high, and a stretchability of a diving suit made therefrom is sometimes degraded.

In case that the polychloroprene latex of the present invention is a latex obtained by emulsion-copolymerizing 2-chloro-1,3-butadiene and 2,3-dichloro-1,3-butadiene in the presence of an alkali metal rosinate, a viscosity of the adhesive of the present invention may be adjusted so as to be suitable for a coating method and a coating apparatus used, and a viscosity after mixing the main agent and the curing agent is preferably from 1,000 to 12,000 (mP·s) (B type viscometer, 25° C., 30 rpm). When the viscosity is less than 1,000 (mPa·s), the surface of a foamed rubber material causes a repellent problem, and if the viscosity exceeds 12,000 (mPa·s), it becomes difficult to obtain a uniform coating.

In case that the polychloroprene latex used in the present invention is a copolymer obtained by copolymerizing a monomer mixture of 2-chloro-1,3-butadiene and at least one kind of carboxyl group-containing vinyl monomers as essential monomers in the presence of polyvinyl alcohol, a viscosity of the adhesive may be adjusted so as to be suitable for a coating method and a coating apparatus used, and a viscosity after mixing the main agent and the curing agent is preferably from 1,000 to 15,000 (mPa·s) (B type viscometer, 25° C., 30 rpm) If the viscosity is less than 1,000 (mPa·s), the surface of a foamed rubber material causes a repellent problem, and if the viscosity exceeds 15,000 (mPa·s), it becomes difficult to obtain a uniform coating.

A coating method and a coating apparatus used in the step of coating an adhesive on a foamed rubber material in the bonding method of the present invention is not specially limited. Examples of the coating method include a curtain flow coater method, a bar coater method, a roll coater method, and the like, and the roll coater method includes a gravure roll coater method and a reverse gravure roll coater method. Among them, a roll coater method is preferable since it is possible to more uniformly coat the adhesive.

A coating amount is not specially limited, but it is necessary to control the coating amount so as to prevent the adhesive from oozing out from cloths, and a preferable coating amount is from 20 to 200 g/m$^2$ (wet).

In the step of press-bonding by overlaying a cloth on a foamed rubber material in the bonding method of the present invention, it is necessary to overlay the cloth immediately after coating an adhesive on the foamed rubber material, that is, before drying the adhesive.

The state of "before drying an adhesive" means such a time as taken until 80% of a water content in an adhesive layer is reduced, i.e. until 100% of the water content in the adhesive is reduced to 20% at the time of mixing the main agent and the curing agent, and during this time, a cloth is overlayed on the adhesive layer.

The reason why a cloth is immediately overlayed on the adhesive layer is that while overlaying a cloth on the adhesive layer in the wet state, an anchor effect to the cloth can be achieved, and a more satisfactory bonding strength can be obtained than in case of overlaying the cloth on the adhesive layer in dry state. A press-bonding apparatus, a press-bonding condition and a pressing-pressure are not specially limited, and any of heat-pressing and normal temperature-pressing may be employed in the pressure-bonding operation after overlaying the cloth. However, in order to obtain a sufficient initial bonding strength, it is preferable to carry out drying at 60 to 150° C. for 10 seconds to 10 minutes at the same time as pressing or after the pressing operation after overlaying the cloth.

EXAMPLES

Hereinafter, the present invention is further illustrated with reference to Examples, but should not be limited thereto.

Experiment Example 1

85 Parts by weight of water, 5 parts by weight of sodium rosinate having an acid value of 160, 0.8 part by weight of potassium hydroxide, 0.3 part by weight of a sodium salt of formaldehyde naphthalenesulfonic acid condensate and 0.3 part by weight of sodium hydrogensulfite were charged into a reactor having an inner volume of 3 l in a nitrogen atmosphere, and after dissolving the contents, 92 parts by weight of a chloroprene monomer, 8 parts by weight of 2,3-dichloro-1,3-butadiene and 0.03 part by weight of n-dodecyl mercaptan were added thereto with stirring. By using 0.1 part by weight of potassium persulfate as an initiator, polymerization was carried out at 40° C. in a nitrogen atmosphere, and when a final polymerization rate reached 90%, a phenothiazine emulsion was added thereto to terminate the polymerization. Unreacted monomers were removed under a reduced pressure to obtain a polychloroprene latex. Thereafter, the latex was concentrated by heating under a reduced pressure to adjust a solid content so as to be 60 wt %.

A solid content of the polychloroprene latex thus obtained and a gel content of the polymer were measured in accordance with the following methods, and the solid content was 60 wt % and the gel content was 92 wt %.

Experiment Example 2

3.5 Mass parts of polyvinyl alcohol (Denkapoval B-05, manufactured by Denki Kagaku Kogyo K.K.) having a polymerization degree of 550 and a saponification degree of 88 mol % was dissolved in 96 mass parts of water at 60° C. in a nitrogen atmosphere by using a reactor having an inner volume of 3 l. The polyvinyl alcohol aqueous solution thus prepared was cooled close to room temperature, and 99 mass parts of a chloroprene monomer, 1 mass part of acrylic acid and 0.4 mass part of octyl mercaptan were then added thereto. While maintaining the resultant mixture at 45° C., polymerization was carried out by using sodium sulfite and pottasium persulfate as an initiator to obtain a polychloroprene latex. Thereafter, a 20 mass % diethanol amine aqueous solution was added to the polychloroprene latex to adjust to pH 7, and the resultant mixture was concentrated by heating under a reduced pressure so as to adjust to have a solid content of 55 mass %.

A solid content of the polychloroprene latex and a gel content of the copolymer were measured in accordance with the following methods, and the solid content was 55 wt % and the gel content was 29 wt %.

(Measurement of Solid Content Concentration)

An aluminum tray alone was weighed and the weighed amount was represented by "A". An aluminum tray having 2 ml of a latex sample placed thereon was weighed and the weighed amount was represented by "B". The aluminum tray having the latex sample placed thereon was dried at 110° C. for 2 hours under atmospheric pressure, and was weighed and the weighed amount was represented by "C". A solid content concentration (wt %) was calculated in accordance with the following formula.

$$\text{Solid content concentration} = \{(C-A)/(B-A)\} \times 100$$

(Measurement of Toluene-insoluble Content (Gel Content))

A latex sample was freeze-dried and weighed, and the weighed amount was represented by "A". The latex sample was dissolved with toluene at 23° C. for 20 hours (adjusted to 0.6 wt %), and a gel was separated by a centrifugal machine and then using a metal mesh of 200 mesh. The gel content was dried in air, and was dried at 110° C. for 1 hour, and was weighed, and the weighed amount was represented by "B". A gel content (wt %) was calculated in accordance with the following formula.

Gel content=(B/A)×100

Example 1

45 Parts by weight (in terms of solid content) of a terpenephenol resin type tackifier resin (Tamanol E-100, manufactured by Arakawa Chemical Industries, Ltd.), 2 parts by weight (in terms of solid content) of a sodium polyacrylate type thickner (Aron A-20L, manufactured by Toagosei Co., Ltd.) and 3 parts by weight of zinc white (zinc white class 2, manufactured by SAKAI CHEMICAL INDUSTRY CO., LTD.) were blended with 100 parts by weight (in terms of solid content) of the latex obtained in Experiment Example 1 to obtain a main agent.

An aqueous dispersion type isocyanate compound (Takenate WD-730, manufactured by Takeda Chemical Industries, Ltd.) having an isocyanate group-containing rate of 18.6 mass % was used alone as a curing agent in such an amount as to mix 3 mass parts of the aqueous dispersion type isocyanate compound to 100 mass parts solid content of the polychloroprene latex of the main agent. The two part aqueous adhesive thus prepared is referred to as "adhesive A".

The adhesive prepared by mixing the main agent and the curing agent was coated on foamed polychloroprene (thickness: 3 mm) in an amount of 80 g/m$^2$, and a nylon jersey cloth was immediately overlayed thereon and was press-bonded for 1 minute by a press machine heated at 110° C. This bonding method is referred to as "bonding method A".

A bonding strength of a test sample (overlap width size=width 2 cm×length 7 cm) was measured in accordance with the following test.

(Test for Evaluating Initial Bonding Strength)

A 180° peel strength was measured at a pulling rate of 200 mm/min by a tensile testing machine at the time of 10 minutes after the press-bonding.

(Test for Evaluating Normal State Bonding Strength)

A 180° peel strength was measured at a pulling rate of 200 mm/min by a tensile testing machine at the time of 7 days after the press-bonding.

(Test for Evaluating Water-resistant Bonding Strength)

A test sample at the time of one day after the press-bonding was dipped in water for 7 days, and a 180° peel strength was then measured at a pulling rate of 200 mm/min by a tensile testing machine.

(Test for Evaluating Solvent-resistant Bonding Strength)

A test sample at the time of 30 days after the press-bonding was dipped in toluene for 2 seconds, and a 180° peel strength was then measured at a pulling rate of 200 mm/min by a tensile testing machine.

Comparative Example 1

Adhesive A prepared by mixing the main agent and the curing agent of Example 1 was coated on foamed polychloroprene (thickness 3 mm) in an amount of 80 g/m$^2$, and was dried at 70° C. for 10 minutes, and a nylon jersey cloth was overlayed thereon and was press-bonded at room temperature for 1 minute by a press machine. This bonding method is referred to as "bonding method B".

A bonding strength of a test sample (overlap width size=width 2 cm×length 7 cm) obtained by bonding method B was evaluated in the same manner as in Example 1.

Comparative Example 2

Adhesive A prepared by mixing the main agent and the curing agent of Example 1 was coated on foamed polychloroprene (thickness 3 mm) in an amount of 80 g/m$^2$, and was dried at 70° C. for 10 minutes, and a nylon jersey cloth was overlayed thereon and was press-bonded for 1 minute by a press machine heated at 110° C. This bonding method is referred to as "bonding method C".

A bonding strength of a test sample (overlap width size=width 2 cm×length 7 cm) obtained by bonding method C was evaluated in the same manner as in Example 1.

Evaluation results of the latex compositions obtained in Example 1 and Comparative Examples 1 to 2 are shown in the following Table 1.

Example 2

45 Mass parts (in terms of solid content) of a terpenephenol resin type tackifier resin (Tamanol E-100, manufactured by Arakawa Chemical Industries, Ltd.), 0.06 mass part (in terms of solid content) of a water-soluble polyurethane type thickner (Primal RM-8W, manufactured by Rome and Harse Japan K.K.) and 3 mass parts of zinc white (zinc white class 2, manufactured by SAKAI CHEMICAL INDUSTRY CO., LTD.) were blended with 100 mass parts (in terms of solid content) of the polychloroprene latex obtained in Example 2 to obtain a main agent.

An aqueous dispersion type isocyanate compound (Takenate WD-730, manufactured by Takeda Chemical Industries, Ltd.) having an isocyanate group-containing rate of 18.6 mass % was used alone as a curing agent to mix 5 mass parts of the aqueous dispersion type isocyanate compound to 100 mass parts solid content of the polychloroprene latex of the main agent. The two part aqueous adhesive thus prepared is referred to as "adhesive B".

A bonding strength of a test sample (overlap width size=width 2 cm×length 7 cm) was measured in the same manner as in Example 1.

TABLE 1

|  | Example 1 | Comparative Example 1 | Comparative Example 2 |
|---|---|---|---|
| Foamed rubber Cloth | Foamed CR Nylon jersey | Foamed CR Nylon jersey | Foamed CR Nylon jersey |
| Adhesive Bonding method Bonding strength (N/mm) | Adhesive A Bonding method A | Adhesive A Bonding method B | Adhesive A Bonding method C |
| Initial bonding strength | Breakage of material | 0.2 | Breakage of material |
| Normal state bonding strength | Breakage of material | 0.2 | Breakage of material |
| Water-resistant bonding strength | Breakage of material | 0.1 | 0.2 |

Note:
Breakage of material . . . Breakage of foamed polychloroprene material

Comparative Example 3

A bonding strength of a test sample (overlap width size=width 2 cm×length 7 cm) obtained by using adhesive B prepared by mixing the main agent and the curing agent of Example 2 in accordance with bonding method B was evaluated in the same manner as in Example 2.

Comparative Example 4

A bonding strength of a test sample (overlap width size=width 2 cm×length 7 cm) obtained by using adhesive B prepared by mixing the main agent and the curing agent of Example 2 in accordance with bonding method C was evaluated in the same manner as in Example 2.

Comparative Example 5

A composition of 100 mass parts of polychloroprene rubber (Denka Chloroprene A-90, manufactured by Denki Kagaku Kogyo K.K.), 460 mass parts of toluene, 115 mass parts of methyl ethyl ketone, 90 mass parts of methyl methacrylate and 0.5 mass part of benzoyl peroxide was subjected to graft reaction of methyl methacrylate to obtain a CR solvent type adhesive. 2,6-t-butyl-4-methylphenol was used as a polymerization inhibitor to adjust a conversion of the methyl methacrylate so as to be about 30 mass %. This solvent type adhesive is referred to as "adhesive C".

A test sample was prepared by using adhesive C in accordance with bonding method A in the same manner as in Example 1, and a bonding strength was measured in the same manner as in Example 1.

The evaluation results obtained in Example 2 and Comparative Examples 3 to 5 are shown in the following Table 2.

TABLE 2

|  | Example 2 | Comparative Example 3 | Comparative Example 4 | Comparative Example 5 |
|---|---|---|---|---|
| Foamed rubber Cloth | Foamed CR Nylon jersey | Foamed CR Nylon jersey | Foamed CR Nylon jersey | Foamed CR Nylon jersey |
| Adhesive | Adhesive B | Adhesive B | Adhesive B | Adhesive C |
| Bonding method | Bonding method A | Bonding method B | Bonding method C | Bonding method A |
| Bonding strength (N/mm) |  |  |  |  |
| Initial bonding strength | Breakage of material | 0.2 | 0.3 | 0.4 |
| Normal state bonding strength | Breakage of material | 0.3 | Breakage of material | Breakage of material |
| Water-resistant bonding strength | Breakage of material | 0.1 | 0.3 | Breakage of material |
| Solvent-resistant bonding strength | Breakage of material | 0.0 | 0.0 | 0.0 |

Note:
Breakage of material . . . Breakage of foamed polychloroprene material

Comparative Example 6

45 Mass parts (in terms of solid content) of a terpenephenol resin type tackifier resin (Tamanol E-100, manufactured by Arakawa Chemical Industries, Ltd.) and 2 mass parts (in terms of solid content) of a sodium polyacrylate type thickner (Aron A-20L, manufactured by Toagosei Co., Ltd.) were blended with 100 mass parts (solid content) of an acryl resin emulsion (Dianal LX-100, manufactured by Mitsubishi Rayon Co., Ltd.) to obtain adhesive D.

A test sample was prepared by using adhesive D in accordance with bonding method A in the same manner as in Example 1, and a bonding strength was evaluated in the same manner as in Example 1.

Comparative Example 7

45 Mass parts (in terms of solid content) of a terpenephenol resin type tackifier resin (Tamanol E-100, manufactured by Arakawa Chemical Industries, Ltd.) and 2 mass parts (in terms of solid content) of a sodium polyacrylate type thickner (Aron A-20L, manufactured by Toagosei Co., Ltd.) were blended with 100 mass parts (solid content) of a polyurethane resin emulsion (Hydran ECOS3000, manufactured by Dainippon Ink and Chemicals, Incorporated) to obtain adhesive E.

A test sample was prepared by using adhesive E in accordance with bonding method A in the same manner as in Example 1, and a bonding strength was evaluated in the same manner as in Example 1.

Comparative Example 8

45 Mass parts (in terms of solid content) of a terpenephenol resin type tackifier resin (Tamanol E-100, manufactured by Arakawa Chemical Industries, Ltd.) and 2 mass parts (in terms of solid content) of a sodium polyacrylate type thickner (Aron A-20L, manufactured by Toagosei Co., Ltd.) were blended with 100 mass parts (solid content) of a natural rubber latex (DPL-14, manufactured by Regitex K.K.) to obtain adhesive F.

A test sample was prepared by using adhesive F in accordance with bonding method A in the same manner as in Example 1, and a bonding strength was evaluated in the same manner as in Example 1.

TABLE 3

|  | Comparative Example 6 | Comparative Example 7 | Comparative Example 8 |
|---|---|---|---|
| Foamed rubber Cloth | Foamed CR Nylon jersey | Foamed CR Nylon jersey | Foamed CR Nylon jersey |
| Adhesive | Adhesive D | Adhesive E | Adhesive F |
| Bonding method | Bonding method A | Bonding method A | Bonding method A |
| Bonding strength (N/mm) |  |  |  |
| Initial bonding strength | 0.1 | 0.1 | 0.1 |
| Normal state bonding strength | 0.1 | 0.1 | 0.1 |
| Water-resistant bonding strength | 0.1 | 0.1 | 0.1 |
| Solvent-resistant bonding strength | 0.0 | 0.0 | 0.0 |

As evident from Tables 1 and 2, the adhesive and the bonding method (Example 1 and Example 2) of the present invention provide a bonding strength higher than other bonding methods (Comparative Examples 1 to 5), and also provides a bonding strength which is equivalent or higher than the conventional CR solvent type adhesive (Comparative Example 5).

The entire disclosures of Japanese Patent Application No. 11-267999 filed on Sep. 22, 1999, Japanese Patent Application No. 2000-100434 filed on Apr. 3, 2000 and Japanese Patent Application No. 2000-123483 filed on Apr. 25, 2000 including specifications, claims, drawings and summaries are incorporated herein by reference in their entireties.

What is claimed is:

1. A two part aqueous adhesive comprising a main agent containing a polychloroprene latex as a main component and a curing agent, the main agent and the curing agent being separated, wherein the main agent contains (i) a polychloroprene latex obtained by emulsion-polymerizing chloroprene and 2,3-dichloro-1,3-butadiene in the presence of an alkali metal rosinate as an emulsifier, and the curing agent is a curing agent containing a water dispersion type isocyanate compound, and wherein the polychloroprene latex polymer contained in the main agent has a toluene-insoluble content of from 50 to 99 wt %.

2. The aqueous adhesive according to claim 1, wherein the emulsion polymerization to obtain the polychloroprene latex contained in the main agent is carried out at a temperature of from 30 to 50° C.

3. A method for bonding cut surfaces to each other of a spongy part of a laminate of a foamed rubber material and a cloth, which comprises a step of coating the two part aqueous adhesive as defined in claim 1 on the cut surface of the laminate and a step of immediately bonding the cut surfaces to each other.

4. A bonded structure of a foamed rubber material and a cloth bonded in accordance with the method as defined in claim 3.

5. A diving suit prepared by bonding a foamed rubber material and a cloth in accordance with the method as defined in claim 3.

6. The aqueous adhesive according to claim 1, wherein the main agent additionally contains (ii) a tackifier resin in a solid content mass ratio of (i) 100 mass parts to (ii) 20–100 mass parts.

7. A method for bonding a foamed rubber material and a cloth, which comprises a step of coating the two part aqueous adhesive as defined in claim 1 on the surface of the foamed rubber material and a step of immediately overlaying the cloth on the aqueous adhesive coated on the foamed rubber material and press-bonding.

8. A bonded structure of a foamed rubber material and a cloth bonded in accordance with the method as defined in claim 7.

9. A diving suit prepared by bonding a foamed rubber material and a cloth in accordance with the method as defined in claim 7.

* * * * *